United States Patent Office 3,517,288
Patented June 23, 1970

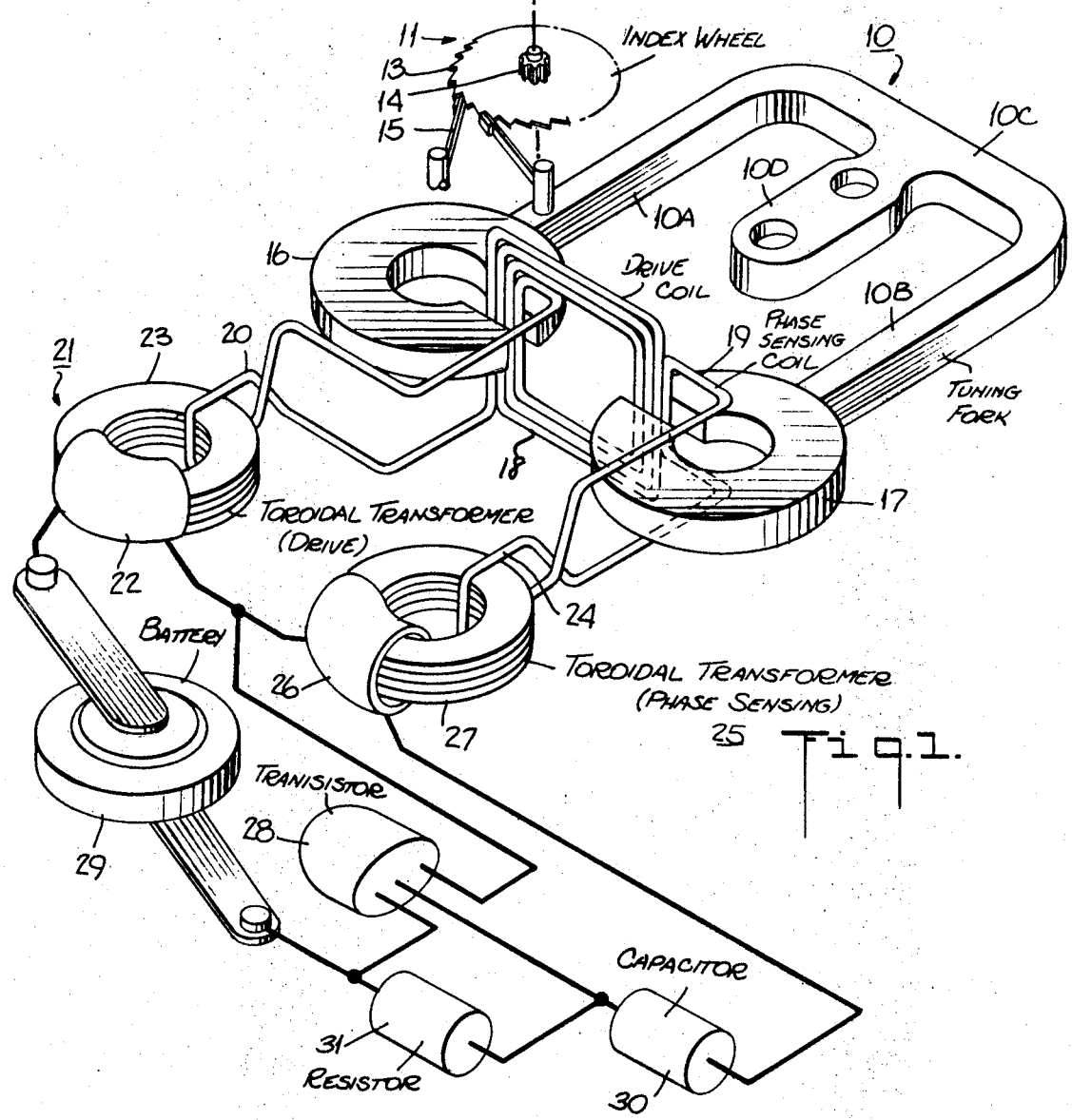
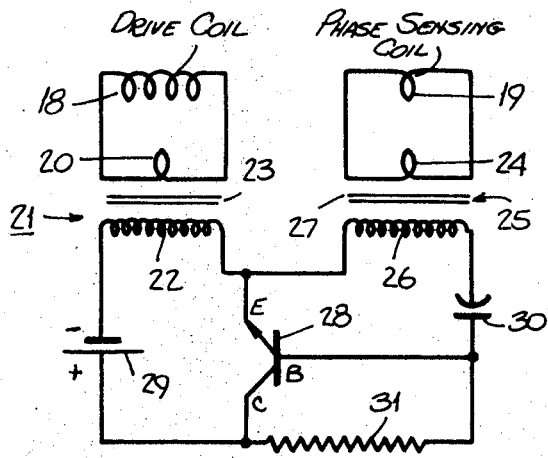

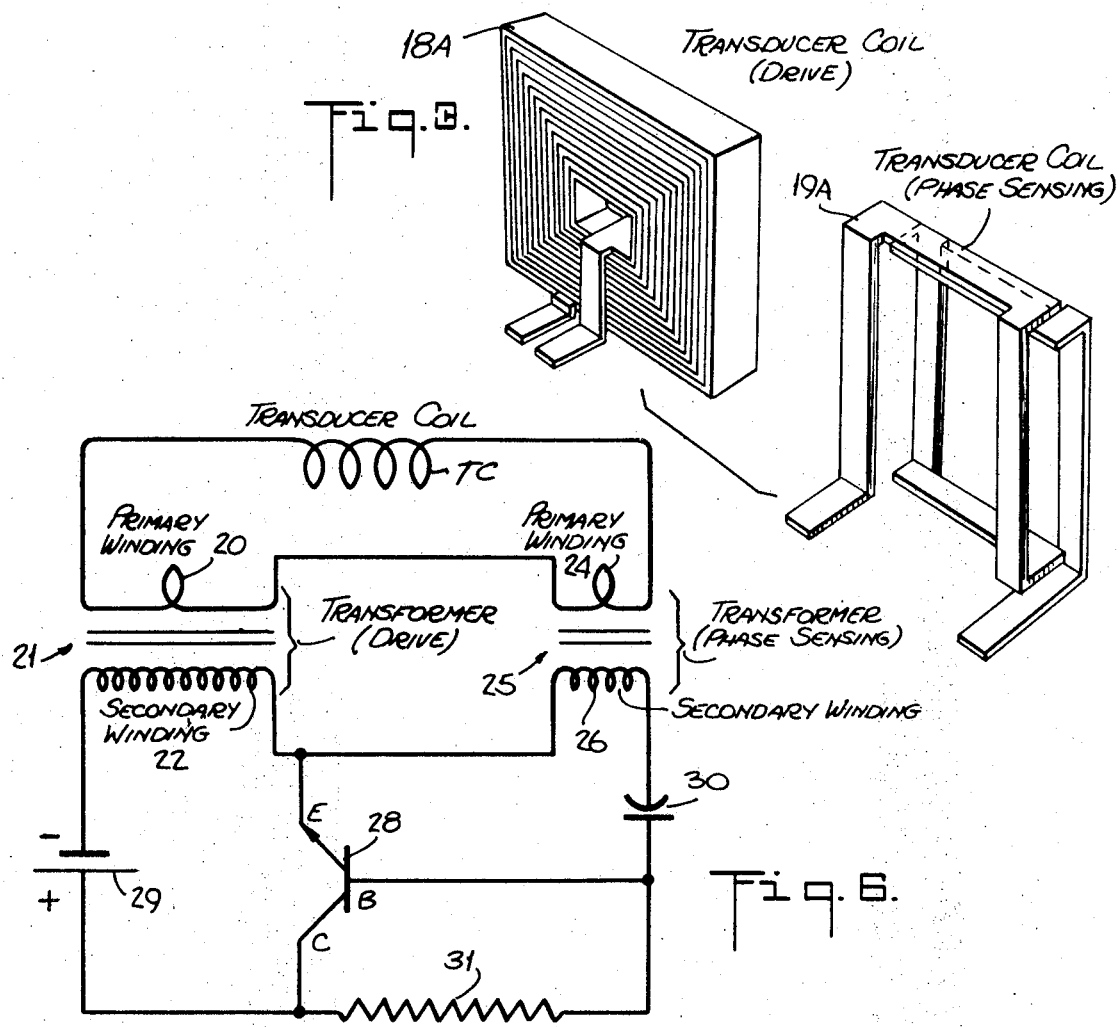
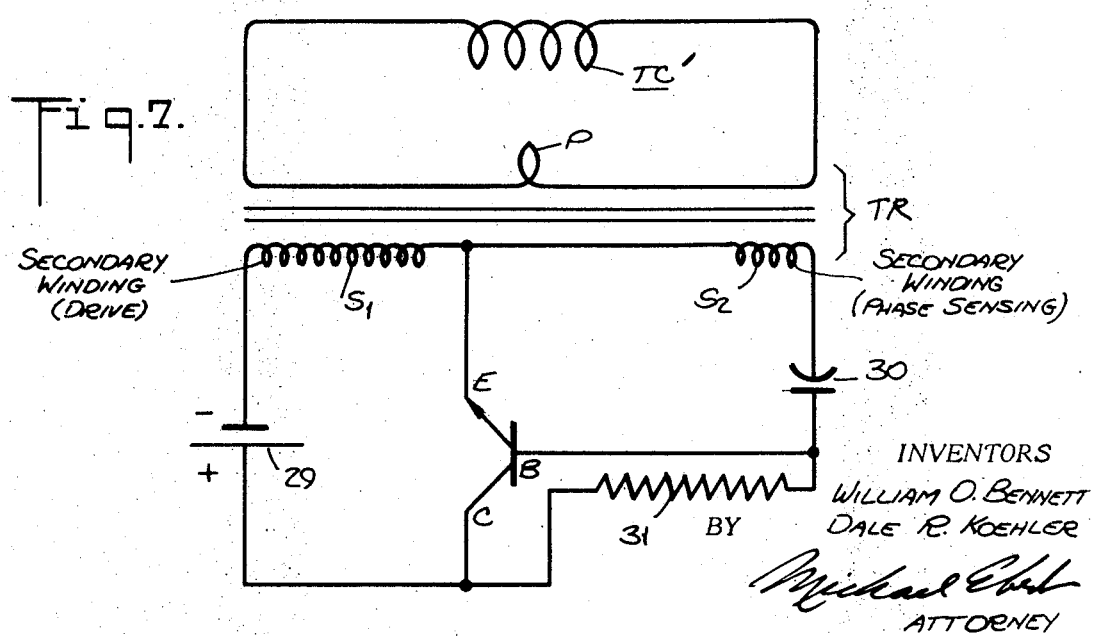

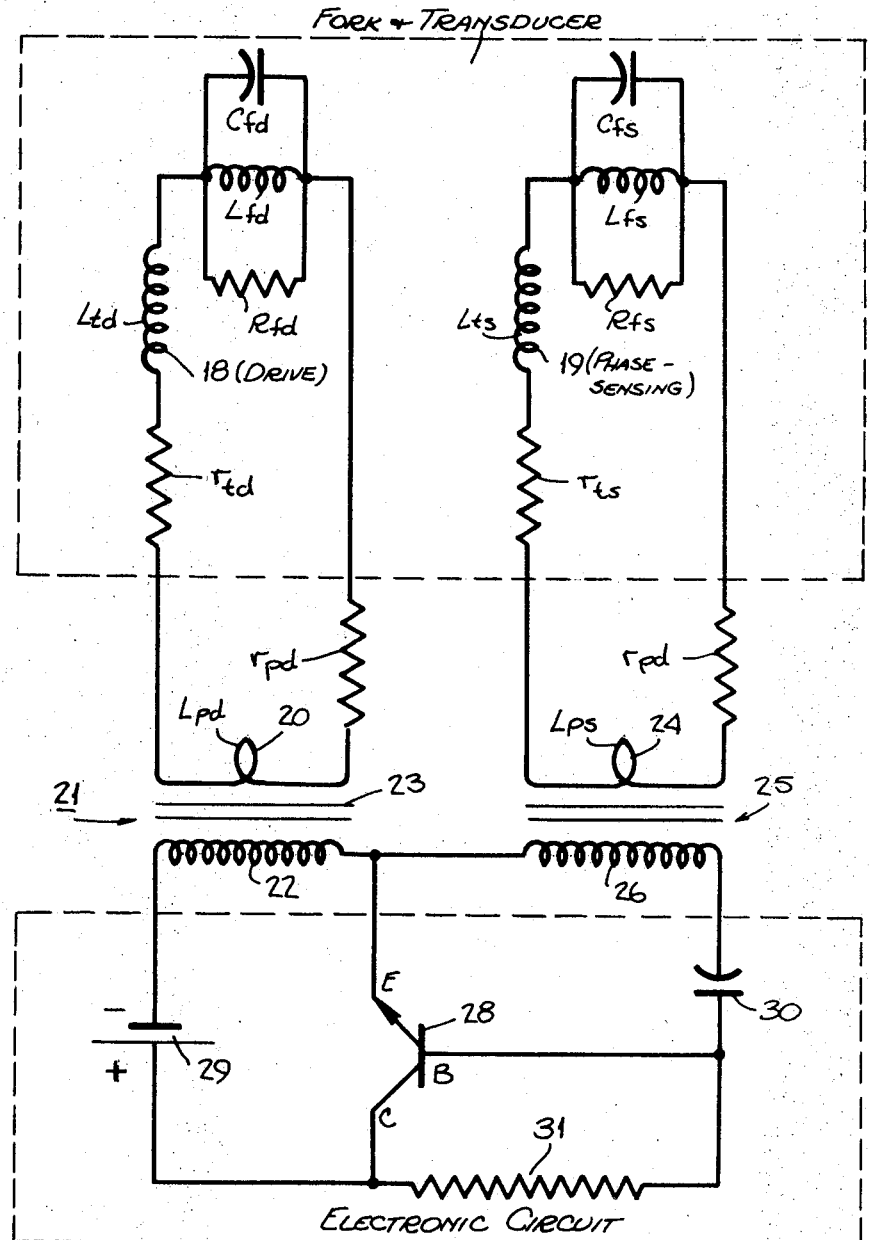
Fig. 4.
Fig. 5.
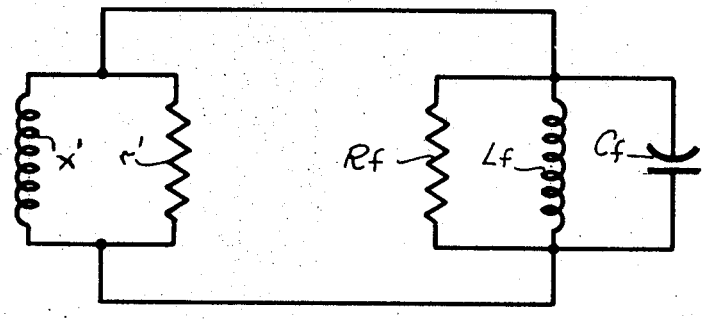

1

3,517,288
TRANSFORMER-COUPLED DRIVE SYSTEM FOR TUNING-FORK OSCILLATOR
William O. Bennett, Bayside, N.Y., and Dale R. Koehler, River Vale, N.J., assignors to Bulova Watch Company, Inc., New York, N.Y., a corporation of New York
Filed Sept. 3, 1968, Ser. No. 757,069
Int. Cl. H02k 33/14
U.S. Cl. 318—129                                5 Claims

---

ABSTRACT OF THE DISCLOSURE

A tuning-fork oscillator in which the fork is electromagnetically actuated by an electronically-controlled drive system functioning to maintain the vibratory amplitude within prescribed limits. In the drive system, fixed phase-sensing and drive coils in combination with magnets attached to the vibratory tines of the fork, serve as transducers, a cyclical EMF being induced in the coils in the course of vibration. The transducer coils are coupled through respective step-up transformers to the input and output circuits of a transistor, the applied voltages acting to render the transistor periodically conductive and to regulate the amplitude of drive current flow therein. The transformers function as voltage amplifiers, hence the dimensions of the coils necessary to produce the requisite voltage levels in the transistor circuits are far smaller than those otherwise necessary in the absence of the transformers.

---

This invention relates generally to tuning-fork oscillators which are electromagnetically actuated by an electronically-controlled drive system, and more particularly to an efficient drive system of reduced size adapted to maintain the vibratory amplitude of the fork within prescribed limits.

In electronic timepieces of the type disclosed in Pat. 3,971,323 of Hetzel, and Pat. Re-26,322 of Bennett et al., a tuning-fork vibrator provides a timekeeping standard or time base, the vibratory action of the fork being sustained by a battery-operated transistorized drive system which includes electromagnetic transducers. The vibratory action of the fork is converted by a motion transformer into rotary motion for operating the gear train of the timepiece.

The motion transformer disclosed in the above-identified patents is in the form of an index wheel having ratchet teeth which are engaged by the tip of an index finger attached to one tine of the tuning fork, whereby the tine vibrations impart turning impulses to the wheel. In an arrangement of this type, the rotation of the index wheel is at a rate determined by the operating frequency of the fork and the ratio of this frequency to the number of teeth on the wheel, provided that the wheel is advanced one tooth for each cycle of vibration. In order to maintain this relationship, it is not essential that the amplitude of fork vibration be held at an exact level but rather that it be governed to lie within prescribed limits.

In the cited Hetzel patent, amplitude regulation of the tuning fork is accomplished in a drive system in which permanent magnets secured to the tines of the fork are associated with fixed drive coils connected in the collector emitter circuit of a transistor. When current flows in the drive coils, the resultant magnetic field produces a thrust on the magnets which acts to excite the fork into vibration.

Since the current flowing in the drive coils is the collector current of the transistor, the greater the intensity of collector current, the stronger the driving force and the higher the amplitude of vibration. Hence to effect amplitude regulation, the arrangement must be such that

2 when the fork amplitude falls below a safe minimum level, the intensity of collector current is increased to a degree tending to raise fork amplitude to this level, but when the fork amplitude rises above a safe maximum level, the intensity of collector current must be decreased to a degree tending to lower the fork amplitude to this level.

The transistor circuit in the drive system includes a biasing network which is charged by current passing through the base-emitter circuit during the conductive periods of the transistor, the network normally biasing the transistor to cut-off. However, alternating voltage induced in a fixed phase-sensing coil associated with one of the tine magnets and connected to the base of the transistor, overcomes the cut-off bias for a brief interval in the course of each operating cycle of the tuning fork.

Thus collector current can flow only when the cut-off bias is lifted from the base of the transistor during the brief conductive interval in each operating cycle. The intensity of collector current depends upon the voltage applied to the collector, which voltage is the algebraic difference between the battery voltage and the back EMF induced in the drive coils. The key to amplitude regulation lies in the level of the induced EMF produced in the drive coils, for when the peak value of this back EMF is slightly less than battery voltage at normal fork amplitude so that collector voltage is close to zero, the transistor characteristics are then such that any slight change in collector voltage will produce a proportionately large change in collector current. When this condition prevails, the transistor operates in its proportional mode.

Hence a drop in fork amplitude will decrease the induced EMF, thereby raising the collector voltage and sharply increasing collector current to produce much stronger drive pulses to increase the amplitude of fork vibration. But if the amplitude of the fork increases above the normal value, the back EMF will also increase and become even closer or equal to battery voltage, in which event the voltage now on the collector is reduced to almost zero, thereby virtually cutting off collector current and diminishing fork amplitude.

In summary, amplitude control in the Hetzel patent is effected by an induced or back EMF voltage in the drive coils which causes the transistor in the drive system to operate in its proportional mode and brings about rapid changes in collector current which tend to compensate for deviations in fork amplitude from the acceptable range.

Each coil in conjunction with its associated magnet constitutes a transducer which converts the physical movement of the magnet into electrical energy. Hence the sinusoidal voltage output of each coil depends on the physical amplitude of this movement, as well as on the number of turns in the coil. In order to induce voltages in the phase-sensing and drive coils at a level sufficient to operate the associated transistor circuit, it is essential in the context of the arrangement disclosed in the Hetzel patent to provide multi-layer helical coils having a large number of turns of extremely fine gauge insulated wire, the coils being situated within the air gaps of the associated magnets and being fixedly mounted on the base or pillar plate of the timepiece. Because of the relatively large size of such coils, they impose a definite limit on the extent to which the timepiece can be reduced in size. Since the traditional commercial preference is for thin wristwatches, this constitutes a distinct practical drawback.

Moreover, with the helical-coil arrangement operating in conjunction with a magnetic structure in which the permanent magnet is coaxially disposed with respect to the coil, should the timepiece be subjected to shock, the magnet attached to the tine may be momentarily displaced from its axial position and come in contact with the coil structure, thereby interfering with the proper vibratory action of the fork and causing a deviation in timing.

Accordingly, it is the main object of this invention to provide a tuning-fork oscillator which may be incorporated in a timepiece or used for any other purpose to provide mechanical or electrical impulses at a constant rate and at a regulated amplitude level, which oscillator includes relatively small transducers making it possible to reduce substantially the over-all dimensions of the oscillator or timepiece.

While the invention will be described in connection with a timepiece in which the vibratory action of the electromagnetically-actuated tuning fork is converted into rotary motion by a mechanical motion converter, it is to be understood that the invention is by no means limited thereto and may be used in conjunction with timepieces having magnetic motion converters or with tuning-fork oscillators serving as frequency generators rather than as timing motors.

Also an object of the invention is to provide a drive system for a tuning fork, which operates at high efficiency and which is of rugged construction, the transducer arrangement being relatively immune to shock effects.

Yet another object of the invention is to provide a drive system of the above-described type in which the drive and phase-sensing coils are coupled through respective transformers to the input and output circuits of a transistor, the applied voltages acting to render the transistor periodically conductive and to govern the amplitude of current flow therein.

A significant feature of the invention is that the transformers function as voltage amplifiers, hence the dimensions of the coils necessary to produce the requisite levels of voltage are but a fraction of the coil dimensions otherwise necessary in the absence of the transformers.

Still another object of the invention is to provide a drive system of the above-noted type, in which the transformers are of miniature, toroidal design, the impedance ratio between the fork transducer coil and the primary of the associated transformer being such as to insure minimum electrical losses in the tuning-fork drive system.

A further object of the invention is to provide a drive system in which the physical damping action of transducers on the tuning fork is minimized, thereby improving the "Q" of the oscillator.

Briefly stated, these objects rae attained in an electronically-controlled drive system for electromagnetically-actuating a tuning fork and for maintaining the vibratory amplitude thereof within prescribed limits, the system including a transducer formed by at least one magnet secured to one tine of the fork and at least one fixed coil associated with the magnet and yielding a cyclical induced EMF in the course of fork vibration. The transducer is coupled by step-up transformer means to the input and output circuit of a battery-energized transistor which is normally biased to cut-off, a portion of the amplified cyclical EMF going to the input circuit to overcome the bias once each cycle to produce periodic drive pulses in the output circuit which are applied to the transducer to actuate the fork.

Another portion of the induced EMF yielded by the transducer is supplied by the transformer means to the output circuit in opposition to the battery voltage and at a peak amplitude which is nearly equal to the battery voltage to cause the transistor to operate in its proportional mode to effect amplitude regulation of the fork vibration.

For a better understanding of the invention as well as other objects and further features thereof, reference is made to the following detailed description to be read in conjunction with the accompanying drawing, wherein:

FIG. 1 is a perspective view of a preferred embodiment of a tuning-fork oscillator in accordance with the invention;

FIG. 2 is a schematic diagram of the electronic drive system included in the oscillator;

FIG. 3, in perspective, shows an alternative form of drive and phase-sensing coil structure for the transducers;

FIG. 4 shows the tuning-fork oscillator schematically, with the tuning fork and the associated transducers replaced by their electrical equivalents;

FIG. 5 shows the electrical equivalents for the drive and sensing elements;

FIG. 6 shows one alternative embodiment of a tuning-fork oscillator in accordance with the invention; and FIG. 7 shows another alternative embodiment of the oscillator.

THE BASIC STRUCTURE OF THE TUNING-FORK OSCILLATOR

Referring now to FIG. 1, there is shown an electronic timepiece in accordance with the invention, the timepiece being constituted by a tuning fork, generally designated by numeral 10, whose vibratory action is converted into rotary motion by a motion transformer, generally designated by numeral 11.

Tuning fork 10 is provided with a pair of flexible tines 10A and 10B interconnected by a relatively inflexible base 10C, the base having an upwardly-extending stem 10D secured to the pillar plate or the framework by suitable screws. In practice, the central area of the pillar plate is cut out to permit unobstructed vibrations of the tines. The tuning fork functions as a frequency standard of high "Q," and because this vibrator has no pivots or bearings its timekeeping action is substantially independent of the effects of friction.

Motion transformer 11 is of the mechanical type and comprises an index finger 12, one end of which is attached to tine 10A of the tuning fork, the other end having a jeweled tip engaging the teeth of an index wheel 13, whereby the oscillations of the tine transmit turning impulses to the wheel. The rotation of index wheel 13 is at a rate determined by the operating frequency of the fork and the ratio of this frequency to the number of teeth on the wheel. The shaft of the wheel is provided with a pinion 14 which intermeshes with the first wheel in the gear train (not shown) for operating the hands of the timepiece.

Operating in conjunction with index wheel 13 is a pawl 15 which prevents reverse motion of the wheel and which, as disclosed in the above-identified Bennett et al. patent, is preferably phased several teeth plus one-half tooth from the finger in advance thereof in the direction of wheel rotation. It is to be understood that the invention is not limited to mechanical motion converters, and is operable with other means to convert the vibrating action into other forms of motion or energy, such as magnetic escapements. In all instances, it is necessary or desirable to maintain the vibratory amplitude within prescribed limits.

Attached to the free end of tuning-fork tine 10A is a C-shaped permanent magnet 16 which may be fabricated of "Alnico" or similar material. The magnet is in the form of a split ring defining north and south poles N and S, separated by an air gap. The central axis of the magnet ring is perpendicularly disposed with respect to the longitudinal axis of the associated tine. An identical C-shaped permanent magnet 17 is attached to the free end of tine 10B, the air gaps of magnets 16 and 17 facing each other and lying at right angles both to the central axes of the rings and the longtiudinal axes of the tines. The arrangement is such that the two C-shaped magnets lie within the vibrating plane of the fork.

Fixedly disposed within the air gaps of magnets 16 and 17 are the respective short sides of a spirally-wound coil 18 having a rectangular "pancake" configuration. All of the convolutions of coil 18 lie in a common plane which is positioned at right angles to the vibratory plane of the tuning fork. Coil 18 is formed of wire having a circular cross-section, and serves as the drive coil. Fixedly disposed within the air gap of magnet 17 is a single-turn coil 19 of rectangular configuration, this coil also being positioned perpendicularly with respect to the vibratory plane of the tuning fork. Coil 19 serves as a phase-sensing coil.

Drive coil 18 is connected to the primary winding 20 of a toroidal transformer 21 having a secondary winding 22. Both windings are wound about an annual core 23 of high permeability, the core being laminated to reduce eddy-current losses. Phase-sensing coil 19 is connected to the primary winding 24 of a similar toroidal transformer 25, having a secondary winding 26 and an annular core 27.

Secondary winding 22 of transformer 21 is connected between the emitter E and collector C of a transistor 28 through a battery 29 which, in practice, is preferably a single mercury cell having a voltage of 1.3 volts, which remains constant throughout the effective life of the battery. Secondary winding 26 is connected between the emitter E and base B of transistor 28 through a capacitor 30, the base being connected to the collector through a resistor 31.

OPERATION OF THE TUNING-FORK OSCILLATOR

In operation, when transistor 28 is rendered momentarily conductive, a current pulse from battery 29 is delivered to drive coil 18, through the action of transformer 21, the resultant magnetic field producing a thrust on magnetic elements 16 and 17, causing the tines attached thereto to deflect in opposite directions, thereby exciting the fork into vibratory action.

The reciprocal movement of the magnetic elements induces a cyclical EMF in both the drive and phase-sensing coils, which assumes the form of a sinusoidal voltage whose frequency corresponds to the natural frequency of the fork. The voltage induced in phase-sensing coil 19 is applied through transformer 25 to the base B of transistor 28 to overcome a bias imposed thereon by capacitor 30 and resistor 31, to control the instant or phase position in the course of each cycle when the drive pulse is to be delivered to drive coil 18.

The EMF induced in drive coil 18, amplified by transformer 21 is in series opposition to the voltage applied by battery 29 to collector C. Battery voltage has a constant value, whereas EMF is a function of tine amplitude. If the resultant voltage at the collector C is close to zero at normal fork amplitude, the transistor will operate in its proportional zone and will be highly sensitive to changes in induced EMF resulting from fluctuation in tine amplitude, thereby effecting regulation of amplitude. A detailed analysis of this operation will be found in said Hetzel patent.

In considering the voltage actually established on the collector C, one must take into account the constant battery voltage, the peak value of cyclical EMF produced in the collector circuit, and the voltage drop produced by the resistance of the secondary of transformer 21, when collector current flows therethrough. If, for example, battery voltage is 1.3 volts and the peak cyclical EMF is 1.2 volts, and the voltage drop is .05 volt, then the voltage on the collector will be a mere −50 millivolts, at which level the transistor will operate in its proportional zone.

Assuming that the drive coil as shown in FIG. 1 has seven conductors which intersect the field of the associated magnets, the ratio of voltage induced therein as against that induced in the single-turn phase-sensing coil is 7 to 1. The peak EMF voltage induced in this drive coil at normal fork amplitude, is well below the 1.2 volt value necessary to produce amplitude control, in the example given above.

However, transformer 21 functions as a voltage amplifier. The turns ratio of transformer 21 is such as to step up the voltage applied to collector C to the desired level necessary to effect amplitude control. Similarly, transformer 25 steps up the value of the phase-sensing coil voltage to the level necessary to overcome the bias applied to base B. If the two transformers are identical and each has N turns in the secondary winding, the voltage appearing across secondary winding 22 is N times that developed across drive coil 18, and that across secondary winding 26 is N times that across phase-sensing coil 19.

Without transformers, the transducer system must be so proportioned that the electronic drive circuit will pump energy into the vibrating fork until a physical amplitude of vibration is achieved wherein the peak of the back EMF in the drive coil is nearly equal to battery voltage. With a transformer arrangement as disclosed herein, the starting energy-delivery action would be the same, save that an equilibrium physical amplitude of vibration will be achieved, wherein the peak value of the EMF in the secondary of the transformer coupled to the drive coil will be nearly equal to battery voltage. But because of the voltage-amplifying action of the transformers, this physical amplitude will be $1/n$ times the physical amplitude without a transformer. It is possible, therefore, with a transformer system, to select any desired operating amplitude by choosing an appropriate transformer turns ratio. This ability to select the operating amplitude constitutes a major advantage of the invention.

ALTERNATIVE COIL ARRANGEMENT

In the arrangement shown in FIG. 1, the drive and phase-sensing coils 18 and 19, which are formed of relatively stiff wires of large cross-section that interact with the fields of the associated vibratory magnets, lie in a plane which is perpendicular to the vibratory plane of the tuning fork 10. In the event the tuning fork tines are momentarily displaced by shock forces in any direction, the tines will be deflected either in the vibratory plane of the fork or in a direction normal thereto, but in any event, the tines will not move in a direction causing the C-shaped magnets therein to touch the coils and thereby interfere with tine movement. This arrangement is therefore advantageous, for shock forces will not affect the proper relationship of the coils and magnets.

In order to provide a stable, self-supporting coil structure, the coils, as shown in FIG. 3, may be formed of flat, ribbon-like conductors which are suitably insulated and spirally wound to form pancake coils having a rectangular configuration. The drive coil 18A in this arrangement has approximately four times as many turns as drive coil 18 in FIG. 1. Phase-sensing coil 19A has its turns arranged on either side of the drive coil sections, the two being diagrammatically shown in exploded fashion, for convenience in presentation.

In the coil arrangements shown in FIGS. 1 and 3, the coils lie in a common plane in an open magnetic air gap, and as the magnets vibrate, no air is compressed, as in prior magnetic cup arrangements. Hence air damping of the tines is minimized, and the mechanical Q of the fork system is not affected materially by the transducers.

DESIGN CONSIDERATIONS

In considering the operation of the transformer-coupled tuning-fork drive circuit and transducer system, reference is now made to FIG. 4, in which the fork and its associated transducers are replaced by their electrical equivalents.

It is well known that mathematical equations descriptive of the motion of a vibrating fork and of the electromagnetic forces bringing about this motion are analogous to equations applicable to current flow in an electric circuit consisting of resistive, inductive and capacitative elements. Hence one may replace the kinematic variables of the tuning fork by electrical equivalents and then treat the fork motion as an electrical current problem.

Thus the resistive, inductive and capacitive values of the tuning fork are designated by symbols $R_f$, $L_f$ and $C_f$ (the subscripts $d$ and $s$ represent the drive and sensing sections, respectively). The symbols $L_{td}$ and $r_{td}$ represent the inductive and resistive values of drive coil 18, while symbols $L_{ts}$ and $r_{ts}$ represent those of sensing coil 19. The inductive and resistive values of primary winding 20 of the transformer 21 are represented by symbols $L_{pd}$ and $r_{pd}$, while those of primary winding 24 of transformer 25, by symbols $L_{ps}$ and $r_{ps}$.

The reason for so representing the fork-transducer system is to lay the groundwork leading to the proper design of the transformer and transducer so that the system will behave in optimum fashion to conserve power and to maintain a high standard of timekeeping accuracy.

In order for the tuning-fork oscillator to behave in optimum fashion, damping forces imposed on the fork must be minimized, so that the highest possible Q is obtained. The physical arrangement of the coils and magnets forming the transducers is such, as pointed out previously, as to obviate physical damping by air. It is however also necessary to design the circuit so as to produce minimal electrical damping of the fork. To this end, the impedance presented by the inductance and resistance of each transformer-transducer combination must be large compared to the impedance of the fork.

In prior arrangements of the type disclosed in the above-identified Hetzel patent, in which the sensing and drive coils are directly coupled to the input and output circuits, respectively, of the transistor, this is accomplished by means of the very large impedance value presented by the transistor in its cut-off condition.

In the present invention, with transformer coupling between the transducer coils and the transistor circuits, consideration must be given to the design of each transformer to avoid undue electrical damping of the tuning fork by the resistive impedance of the transformer and transducer. In wristwatch applications, in which power is supplied by a self-contained single battery cell having a very limited power capacity, it is particularly important that energy losses be kept to an absolute minimum to conserve driving power. Moreover, electrical damping also manifests itself in a decreased Q of the mechanical oscillator, thereby degrading the timekeeping ability of the system.

In the arrangement shown in FIG. 4, the values of the inductances $L_{td}$ and $L_{ts}$ of the drive and sensing coils are negligible compared to those of the associated transformers, and may therefore be disregarded. Furthermore, the values of the resistances $r_t$ and $r_p$ can be lumped into one resistance. Accordingly, $L_p = L$ and $r_p + r_t = r$.

We now further replace L and r, as shown in FIG. 5, by the parallel combination equivalent $L'$ and $r'$. Expressions for the inductive reactance $X'$ and the resistive impedance $r'$ are:

$$X' = \omega L' = \frac{X^2 + r^2}{X}$$

and $$r' = \frac{X^2 + r^2}{r}$$

where, $$X = \omega L = 2\pi f L$$

($f$ = fork frequency)

To minimize the electrical damping of the transformer and transducer on the fork, impedance $r'$ must be large compared to $R_f$, the resistive impedance of the fork. A large impedance value $r'$, as generated by L and r, is attained by designing r so that it is as small as possible, and designing L so that it as large as possible, as evidenced by the above expressions. To this end, a minimum number of turns of large-diameter wire is therefore desirable in the transducer magnet gap and in the transformer primary, while a transformer with a large inductance must be used.

The requirement for high inductance in a small space is best achieved by the use of a toroid with a very high-permeability core material, for such a configuration presents no magnetic air gaps and hence affords the highest possible inductance. High-permeability cores give rise to eddy-current losses. Lamination of the core to minimize such losses is therefore necessary. The inductance is further increased by a core design having a large cross-section and a small circumference.

It is also a requirement that the value of inductance $L'$ should be large, so as not to alter the operating frequency of the system. The frequency of the oscillator should be determined solely by the natural frequency of the tuning-fork time base. It is essential, therefore, that inductance $L'$ be much larger than inductance $L_f$.

A sample design calculation may be useful in understanding the factors involved in arriving at an optimum design. For example, one should be able to generate an air-gap field strength for a 4 mm.-diameter C-shaped magnet of approximately 2000 gauss. With a magnet of this strength on each tine of the tuning fork, and ten turns of the maximum-diameter wire which can be accommodated in a 6 mm.$^3$ air gap, a resistance r of $7 \times 10^{-3}$ ohms is achieved, and an equivalent fork resistance $R_f$ of approximately 1.2 ohms results when operating with a conventional 360 c.p.s. fork of the type currently employed in "Accutron" turning-fork watches manufactured by Bulova Watch Company.

A toroid with a core permeability of $5 \times 10^5$, a core section of 2 mm.$^2$, and a 4 mm. O.D., with a one-turn primary, produces a resistance of 0.3 ohm. This yields an equivalent transformer drive coil impedance as compared to the fork impedance of approximately 10 to 1, which is an acceptable operating ratio.

For a practical working vibration amplitude (say $\pm 0.05$ mm.), to achieve an induced cyclical EMF voltage in the secondary, which at its peak is nearly equal to a battery voltage of 1.3 volts, requires a step-up transformer ratio of approximately 1000:1, thereby requiring, for a one-turn primary, a 1000-turn secondary.

MODIFIED TRANSDUCER AND TRANSFORMER CIRCUITS

In the arrangements previously disclosed, the tuning-fork operates in conjunction with separate phase-sensing and drive coils, each coil being coupled to the transistor through a respective step-up transformer which provides a voltage at the level necessary to sustain the tuning fork in operation at an amplitude within the prescribed range.

In the alternative arrangement shown in FIG. 6, a single transducer coil TC is provided, which operates in conjunction with permanent magnets attached to the tines of the fork, in the manner similar to that shown in FIG. 1 in connection with drive coil 18. However, the single transducer coil acts to carry out both drive and phase-sensing functions. This is accomplished by means of transformers 21 and 25 whose primary windings are connected in series to the single transducer coil TC.

Thus, in operation, collector-current pulses produced in the output circuit of the transistor 28 and flowing through the secondary of transformer 21 are applied to the coil TC, to excite the fork. The cyclical EMF induced in the coil is fed through both primaries and is divided by the transformers such that the step-up voltage value in secondary 26 is appropriate for overcoming the bias in the base circuit and in secondary 22 is appropriate for effecting amplitude control in the collector circuit. Because the input and output circuits of the transistor are closely coupled through the transducer coil TC common thereto, feedback may arise to cause the system to oscillate parasitically at a high frequency, well above the normal operating frequency of the oscillator. Such feedback may be prevented by well-known filtering techniques (not shown).

In lieu of separate transformers, one may associate the single transducer coil $TC^1$ as shown in FIG. 7, with a toroidal transformer TR having a single primary P, and two secondaries $S_1$ and $S_2$ wound about a common annular core. Secondary $S_1$ has a turns ratio suitable for the drive circuit, while secondary $S_2$ has a turns ratio suitable for the phase-sensing circuit. Here, also, feedback may arise due to the close coupling of input and output circuits and cause parasitic oscillations, requiring the use of filtering techniques for proper functioning of the system.

In the oscillator disclosed hereinabove, the electromagnetic transducer is of the type in which the coil is fixedly disposed with respect to a magnet attached to a vibratory tine. It is to be understood that the invention is not limited to this arrangement, but encompasses all other forms of transducers for activating the fork and for producing induced voltages for operating the transistor circuit.

Thus one may use a transducer in which the coil is secured to the tine of the fork and vibrates with respect to a fixed magnet. Or the coil may be wound about a fixed magnet forming part of a magnetic circuit disposed adjacent the tine, the tine being formed of ferromagnetic material. In all instances, drive pulses applied to the coil of the transducer give rise to changes in magnetic flux to excite the associated fork into vibration, the vibrations inducing a voltage in the coil.

What we claim is:

1. In a tuning-fork oscillator provided with a tuning fork having a pair of tines, an electronically-controlled drive system for electromagnetically actuating said fork and for maintaining the vibratory amplitude thereof within prescribed limits, said system comprising:
   (a) a transducer operatively associated with said fork and including an annular permanent magnet attached to each tine of the fork and lying within the vibratory plane of the fork, the magnets having narrow air gaps facing each other, and a spiral-wound coil all of whose turns lie in a common plane normal to said vibratory plane, said coil being disposed within said air gaps, said transducer yielding a cyclical induced EMF in the course of fork vibration,
   (b) an electronic control circuit having a transistor, a direct-voltage source for energizing the transistor, and bias means normally to maintain said transistor at cut-off, and
   (c) step-up transformer means intercoupling said transducer to the input and output circuits of the transistor to supply a portion of said EMF to the input circuit to overcome said cut-off bias once each vibratory cycle to produce periodic drive pulses in the output circuit which are applied to said transducer to actuate the fork, said transformer means also supplying a portion of said EMF to the output circuit in opposition to the voltage of said source at the instant of occurrence of said drive pulses and having a step-up ratio producing a peak amplitude which is nearly equal to the magnitude of said source voltage to cause said transistor to operate in its proportional mode to effect amplitude regulation of the fork vibration, said transformer means being toroidal and including an annular core of high permeability, a single-turn primary surrounding said core and coupled to said transducer coil, and a secondary surrounding said core and having multiple turns providing the desired ratio.

2. A system as set forth in claim 1, wherein said transformer means is constituted by a step-up transformer having a single primary connected to said coil and having two secondary windings, one winding supplying said EMF to said input circuit, the other winding supplying said EMF to said output circuit.

3. A system as set forth in claim 1, wherein said transformer means is constituted by two step-up transformers whose primaries are connected in series to said coil, the secondary winding of one transformer supplying EMF to said input circuit, the secondary winding of the other transformer supplying EMF to said output circuit.

4. A system as set forth in claim 1, wherein said core is laminated.

5. A timepiece including a tuning-fork oscillator, as set forth in claim 1, further including means to convert the vibratory motion of one of said tines into rotary motion for driving a gear train.

References Cited

UNITED STATES PATENTS

| | | | |
|---|---|---|---|
| 2,728,003 | 12/1955 | Beer | 335—221 XR |
| 3,207,965 | 9/1965 | Lavet | 318—128 |
| 2,926,313 | 2/1960 | Wiegand | 331—154 |
| 3,309,590 | 3/1967 | Reich | 331—116 XR |
| 2,049,179 | 7/1936 | Stallard | 331—156 |
| 3,151,284 | 9/1964 | Kleesattel | 310—26 XR |
| 2,945,168 | 7/1960 | Steinke | 318—128 |
| 3,365,635 | 1/1968 | Shelley | 318—128 |
| Re. 26,322 | 12/1967 | Bennett et al. | 310—25 XR |
| 2,950,447 | 8/1960 | McShan | 331—116 |

FOREIGN PATENTS

| | | |
|---|---|---|
| 1,519,243 | 3/1968 | France. |
| 207,972 | 1908 | Germany. |

MILTON O. HIRSHFIELD, Primary Examiner

B. A. REYNOLDS, Assistant Examiner

U.S. Cl. X.R.

58—23; 310—25; 318—132; 331—116, 156